United States Patent [19]

Rizk et al.

[11] Patent Number: 4,758,648

[45] Date of Patent: Jul. 19, 1988

[54] HIGH SPEED CURE SEALANT

[75] Inventors: Sidky D. Rizk, Westfield; Harry W. S. Hsieh, Rahway; John J. Prendergast, Sr., Freehold, all of N.J.

[73] Assignee: Essex Specialty Products, Inc., Sayerville, N.J.

[21] Appl. No.: 920,747

[22] Filed: Oct. 20, 1986

[51] Int. Cl.[4] .................................... C08G 18/30
[52] U.S. Cl. ................................ 528/53; 528/76; 528/77
[58] Field of Search .................... 528/53, 76, 77

[56] References Cited

U.S. PATENT DOCUMENTS

| | | | |
|---|---|---|---|
| 3,624,010 | 11/1971 | Holdstock | 521/129 |
| 3,645,925 | 2/1972 | Speranza et al. | 521/115 C |
| 3,968,089 | 7/1976 | Cuscurida et al. | 528/50 |
| 4,228,248 | 10/1980 | Zimmerman | 521/115 |
| 4,326,042 | 4/1982 | Zimmerman | 521/115 |
| 4,379,861 | 4/1983 | Haas et al. | 521/115 |
| 4,433,680 | 2/1984 | Yoon | 128/90 |
| 4,500,654 | 2/1985 | Carlsen et al. | 521/129 |
| 4,525,316 | 6/1985 | Galla | 264/54 |
| 4,574,793 | 3/1986 | Lee et al. | 528/53 |
| 4,643,909 | 2/1987 | Kammerer et al. | 427/2 |
| 4,690,842 | 9/1987 | Kammerer et al. | 427/2 |

Primary Examiner—John Kight
Assistant Examiner—Samuel A. Acquah
Attorney, Agent, or Firm—Curtis, Morris & Safford

[57] ABSTRACT

A moisture curable sealant having good stability in the absence of moisture and a rapid cure rate in the sole presence of atmospheric moisture, said sealant comprising a polyurethane prepolymer having an isocyanate functionality between 2.3 and 3.0, and, admixed therewith as a catalyst, from 0.2 to 1.75 percent, by weight of said sealant, of dimorpholinodiethyl ether.

8 Claims, No Drawings

HIGH SPEED CURE SEALANT

The present invention relates to moisture cureable sealant compositions having good storage stability in the absence of moisture and rapid cure rates in the presence of moisture. More in particular, the invention relates to such sealants comprising a polyurethane prepolymer and dimorpholinodiethyl ether (DMDEE) as a catalyst therefor.

Elastomeric polyurethane polymers have heretofore been used in the art for compounding sealants or adhesives for bonding or adhering a variety of materials. Such polyurethane polymers are often prepared to have terminal isocyanate groups. On exposure to atmospheric moisture, the isocyanate groups react with water to form amino groups with the evolution of carbon dioxide. The amino groups so formed further react with available isocyanate groups to form urea linkages, thus effecting a cure of the polymer in the sealant and binding the materials to be adhered. One important use of polyurethane sealants is in the automotive industry for adhering automotive parts made of glass, such as windshields, rear windows, and the like, to a metal chassis.

Curing of the resulting polymer by moisture is often accelerated with catalysts. These materials include metal salts, such as tin and bismuth carboxylates, organosilicon titanates alkyltitanates, numerous amine compounds, and the like.

However, the rapidity with which such catalyzed compositions cure in the presence of atmospheric moisture is often insufficient to meet industrial requirements such as those prevailing on automotive assembly lines. Accordingly, it is now common practice to enhance the cure rate by combining the sealant with water just prior to application to surfaces to be adhered. The polymer/water mixture starts to crosslink and cure immediately. Thus, a typical atmospheric cure at room temperature requires at least about three days for formation of an adhesive seal and about seven days for a cure to full strength, but can be accelerated by the addition of water to a cure sufficient for adhesion in a few hours, for example about six hours, with a full cure of the polymer mixture or sealant in about 24 hours. Such a system is of particular interest for use in the automotive industry for the quick mounting of glass components such as windshields into the body of a vehicle. For ease in combining with the sealant compositions, the water is conveniently incorporated in the form of a paste made from water and one of the filler materials desirable to be included in the sealant composition for other purposes. For example, such pastes can be made from clay and water in proportions sufficient to give the paste the viscosity and flow characteristics required for a particular application.

While such a procedure affords a rapid cure of the sealant systems involved, it also entails the considerable disadvantage that the sealant and water used to accelerate the cure must be combined shortly before the sealant composition is to be employed, and, once the sealant and water have been admixed, the resulting rapidly-curing system cannot be stored. Thus, the rapid cures now common in the prior art require the presence of metering/mixing equipment on the job site and require the continual compounding of batches of sealant and water in amounts no greater than those which can be used conveniently before the ongoing cure of the resulting mixture renders the mixture unworkable.

It is an object of the present invention to provide a "one package" sealant system, i.e. a system capable of rapid cure without the addition of water thereto, which system, although highly reactive in the presence of atmospheric moisture alone, nevertheless has good shelf stability in the absence of moisture.

A feature of the present invention is a sealant comprising a polyurethane prepolymer in combination with DMDEE as a catalyst therefor, in which system the isocyanate functionality of the prepolymer and the concentration of DMDEE catalyst therein both have critical values. With prepolymers having such critical isocyanate functionality and by the employment of DMDEE, specifically, at critical concentration levels, sealant compositions having very rapid cure rates in the presence of atmospheric moisture alone, without the addition of water, have been developed. Such compositions represent a significant advance in the art since they permit the elimination of the mixing of water with sealant just prior to use with all the disadvantage that this entails in the way of equipment, manpower, considerations of pot life, etc.

More in particular, the sealants according to the present invention comprise polyurethane polymers having an isocyanate functionality between 2.3 and 3.0, and preferably between 2.5 and 2.7. With such prepolymers, DMDEE is employed as a catalyst at a concentration between 0.2 and 1.75 percent by weight of the finished sealant compound, preferably between 0.4 and 1.3 percent. At these concentrations, sealants having both an excellent cure rate and good storage staibility are obtained.

The rate of cure of sealant compositions is measured by a standard test involving the determination of the lap shear strength of a seal cured under specific conditions of time, temperature, and humidity. More in particular, the lap shear sample is assembled by creating a sealant bead $\frac{1}{4}''$ wide and $\frac{1}{4}''$ high along the 1'' edge of two substrates each 1'' by 3'' in dimensions, which assembly is then cured for 2.7 hours at 75° F. and 50% relative humidity.

The stability of the sealant on storage in the absence of moisture is evaluated by determining the initial flow rate of a sealant sample, determining its flow rate again after aging at 130° F. for three days in the absence of moisture, and striking the ratio of the aged flow rate to the initial flow rate. The flow rate in each case is defined as the time in seconds required to extrude 20 grams of the sealant through an orifice 0.157'' in diameter under a pressure of 58 pounds per square inch. Clearly, the flow rate ratio would ideally be 1, indicating substantially no polymerization of the system during the aging period. Conversely, flow rate ratios significantly greater than 1 indicate a polymerization of the prepolymer of the sealant in the absence of moisture, i.e. a lack of shelf stability for the systems in the absence of water.

The isocyanate terminated polyurethane polymers of the invention are prepared by the reaction of an organic polyisocyanate with a polyhydroxy compound. If part or all of the polyhydroxy compound has an hydroxy functionality of more than two hydroxy groups per molecule, the polyurethane reaction product is not linear but branched. When later crosslinked, such a branched polymer develops a thermoset polyurethane (elastomeric) character.

In this reaction, the polyisocyanate is employed in excess so that the resultant polymers have isocyanate terminals.

The polyols that may be used are the same as those commonly employed in the prior art for preparing polyurethane resins, e.g. polyester polyols and, particularly, polyether polyols. The polyester polyols include lactone polyols prepared by the polymerization of lactones, compounds such as castor oil, and polyester polyols formed by the reaction of an alkylene glycol with a dicarboxylic acid, for example. Polyether polyols may be prepared by forming alkylene oxide adducts of the polyester polyols and lactone polyols discussed above, or by the reaction of alkylene oxides with materials such as castor oil. However, the preferred polyether polyols are polyoxyalkylene polyols, e.g.. polyoxyallcylene diols prepared, for example, by the homopolymerization or copolymerization of materials such as ethylene oxide and propylene oxide. Polyoxyalkylene triols, for example linear compounds having pendant hydroxy groups or having branched polyether chains, may also be employed as starting compounds in admixture with diols.

The organic polyisocyanates which are reacted in excess with such polyols for formation of the isocyanate-terminated polyurethane prepolymers of the present invention are those taught, for example, in Brode et al. U.S. Pat. No. 3,632, 577. That is, they are aliphatic, cycloaliphatic, araliphatic, or aromatic polyisocyanates, suitably di- and/or tri-isocyanates. Particularly preferred materials for use according to the present invention are diphenyl-methane-4,4'-diisocyanate having aromatic characteristics, the cycloaliphatic diisocyanate 3-isocyanatomethyl-3, 5,5-trimethylcyclohexyl isocyanate (isophorone diisocyanate), and dicyclohexyl-4,4'-methane diisocyanate. Mixtures of two or more of these preferred materials are also preferred for use in the present invention.

As known in the art, the polyols and polyisocyanates are suitably reacted at a temperature between 0° C. and 120° C., preferably between 25° C. and 90° C. The reactions are carried out under an inert atmosphere such as a nitrogen blanket and under anhydrous conditions. The reaction may be suitably be carried out in the presence of a catalyst. The stannous salts of carboxylic acid, such as stannous octoate, stannous oleate, stannous acetate, and stannous laurate are known as catalysts for the formation of urethanes. Also, dialkyltin dicarboxylates such as dibutyltin dilaurate and dibutyltin diacetate are known in the art as urethane catalysts, as are tertiary amines with tin mercaptides. The amount of catalyst employed is generally between 0.005 and 5 percent by weight of the reaction mixture catalyzed, depending on the nature of the isocyanate.

The polyols employed in this reaction, having two or more hydroxyl groups, generally have a molecular weight between about 500 and 6000 and have hydroxy equivalent weights between 50 and 2000. The preferred polyoxyalkylene polyols, such as polyoxypropylene, have hydroxy equivalent weights between 200 and 2000. These materials are reacted with excess isocyanate until the isocyanate content in the prepolymer is close to the critical value mentioned earlier, as determined by titrating the free isocyanate groups in a sample of the prepolymer with dibutylamine. The resulting prepolymers having terminal isocyanate groups have molecular weights between about 3000 and about 10000. The preferred prepolymers have a molecular weight between about 3000 and 6000.

The DMDEE catalyst employed in the compositions of the invention is known, for example, from U.S. Pat. No. 3,645,925 where its usefulness as a catalyst for promoting the reaction of isocyanate groups with water is disclosed. This well-known general reactivity of DMDEE for the catalysis of curing polyurethanes nevertheless would not lead one skilled in the art to the use of the material in the specific systems of the present invention in which their presence in a specific concentration, in combination with polyurethane prepolymers of a critical functionality, results in systems having a cure rate and stability surprisingly and unexpectedly superior with respect to similar systems in which the prepolymers have a different functionality or contain DMDEE in concentrations other than those found to be critical, or in systems employing catalysts for the curing of isocyanates which are even better in their catalytic effect than is DMDEE.

For formulating sealant compositions, the polymer/catalyst mixtures of the invention are combined with fillers and additives known in the prior art for use in elastomeric compositions. By the addition of such materials, physical properties such as viscosity, flow rate, sag, and the like can be modified to desired values. However, to prevent premature hydrolysis of the moisture sensitive groups of the polymer, the fillers should be thoroughly dried before admixture therewith. Exemplary filler materials and additives include materials such as carbon black, titanium dioxide, clays, calcium carbonate, surface treated silicas, ultraviolet stabilizers, antioxidants, and the like. This list, however, is not comprehensive and is given merely as illustrative.

As mentioned earlier, such sealants may also contain one or more plasticizers to modify rheological properties to a desired consistency. Such materials should be free of water, inert to isocyanate groups, and compatible with the polymer. Suitable plasticizers are well-known in the art and include alkyl phthalates such as dioctyl phthalate or dibutyl phthalate, partially hydrogenated terpene commercially available as "HB-40", and alkyl naphthalenes. Diethyl malonate can be used as a stabilizer. Still other materials well-known in the art may be used for the compounding of materials of this type.

The surprising and unexpected results obtained with the specific systems according to the present invention are shown more in particular in the following specific examples given by way of illustration.

EXAMPLE 1

A polyether polyurethane prepolymer having a low degree of branching (isocyanate functionality of about 2.3) was prepared by thoroughly mixing 984.7 g (0.98 eq) of a polyoxypropylene diol having an average molecular weight of about 2000 and commerically available under the tradename "Pluracol P-2010" with 993.0 g (0.68 eq) of a polyoxypropylene triol having an average molecular weight of about 4400 and commercially available under the tradename "Pluracol TPE-4542". The triol is prepared, for example, by the polymerization of propylene oxide onto a trihydric starting material such as glycerin or trimethylol propane. Mixing was effected in a reactor with heating of the mixture to about 55° C. 431.1 g (3.42 eq) of molten diphenylmethane-4,4'-diisocyanate and 0.130 g of stannous octoate were then introduced. The whole mixture was then reacted at 75° C. for one hour. Finally, a plasticizing mixture of 66.5 g of an alkyl naphthalene plasticizer, commercially available under the tradename "Kenplast G", 124.5 g of a dialkyl phthalate plasticizer containing mixed $C_7$-, $C_9$-, and $C_{11}$- linear alkyl groups, and 40.6 g of diethyl malonate was introduced into the reaction vessel under agitation. The reaction product had a viscosity of 4400 cps at 25° C. and an isocyanate content of 1.9% by weight.

EXAMPLE 2

A polyether polyurethane prepolymer having a medium degree of branching (isocyanate functionality about 2.5) was synthesized by blending 536.8 g (0.556 eq) of the diol of Example 1 and 1503.3 g (1.03 eq) of the triol of Example 1 in a reaction vessel and heating the mixture to 55° C. 414.3 g (3.45 eq) of molten diphenylmethane-4,4'-diisocyanate and 0.13 g of stannous octoate were then introduced and the whole mixture was reacted at 75° C. for one hour. After completion of the reaction, diethyl malonate and a mixture of the two plasticizers of Example 1, in the amounts given in that Example, were added to the reaction vessel.

The final product had a viscosity of 5600 cps at 25° C. and an isocyanate content of 1.9% by weight.

EXAMPLE 3

A polyether polyurethane prepolymer having a high degree of branching (isocyanate functionality about 2.66) was synthesized by blending 210.9 g (0.21 eq) of the diol of Example 1 with 1841.3 g (1.26 eq) of the triol of Example 1 in a reaction vessel and heating the mixture to 55° C. 399.7 g (3.17 eq) of molten diphenylmethane-4,4'-diisocyanate and 0.13 g of stannous octoate were introduced and the mixture was then reacted at 75° C. for one hour. After completion of the reaction, diethyl malonate and a mixture of the two plasticizers of Example 1, in the amounts there given, were introduced into the reaction vessel with stirring.

The reaction product had a viscosity of 9400 cps at 25° C. and a final isocyanate content of 1.9% by weight.

EXAMPLE 4

A polyether-polyester polyurethane prepolymer having a high degree of branching (isocyanate functionality about 2.66) was synthesized by blending 106.5 g (0.142 eq) of a polycarbonate diol having a hydroxy equivalent weight of 750 [is this PPG product in greater detail? ], 19.4 g of the alkyl naphthylene plasticizer of Example 1, 9.1 g of the dialkyl phthalate plasticizer of Example 1, and 827.7 g (0.566 eq) of the polyoxypropylene triol of Example 1 and then heating the mixture to 55° C. 192.5 g (1.53 eq) of molten diphenylmethane-4,4'-diisocyanate and 0.06 g of stannous octoate were then introduced with light stirring and the whole mixture was reacted at 75° C. for one hour. After reaction was complete, a mixture of 12.1 g of "Kenplast G" alkyl naphthalene plasticizer, 578.9 g of the dialkyl phthalate plasticizer earlier described, and 19.2 g of diethyl malonate was introduced into the reaction vessel with agitation.

The reaction product had a viscosity of 20,000 cps at 25° C. and a final isocyanate content of 1.9% by weight.

EXAMPLE 5

A polyether-polyester polyurethane prepolymer having a high degree of branching (isocyanate functionality about 2.66) was synthesized by mixing 117.1 g (0.40 eq) of a polycaprolactone triol having an OH equivalent weight of 300 and commercially available under the tradename "Tone PCP-310", 513.3 g (0.53 eq) of polytetramethylene ether glycol (OH equivalent weight =968.9), 19.4 g of the alkyl naphthylene plasticizer earlier described, 290.2 g (0.20 eq) of a polyoxypropylene triol having an average molecular weight of about 4400, and 9.0 g of the dialkyl phthalate plasticizer earlier described and heating to 55° C. 241.7 g (1.92 eq) of molten diphenylmethane-4,4'-diisocyanate and 0.06 g of stannous octoate were then introduced with light stirring and the whole mixture was reacted at 75° C. for one hour. After reaction was complete, a mixture of 12.2 g of alkyl naphthylene plasticizer, 578.6 g of dialkyl phthalate plasticizer, and 19.2 g of diethyl malonate was introduced into the reaction vessel with stirring.

The reaction product had a viscosity of 8800 cps at 25° C. and a final isocyanate content of 1.9% by weight.

EXAMPLES 6–13

To show the superiority of the sealant compositions according to the present invention both with respect to their stability in the absence of moisture and their rapid cure, a number of sealant compositions were made employing the prepolymer of Example 3 in combination with various catalytic materials known in the prior art for the catalysis of isocyanate/water reactions.

More in particular, 1340.2 g of the prepolymer of Example 3 was mixed in each case with 1% by weight of a dried catalyst as shown below in Table I, together with 528.0 g of dried carbon black and 380.0 g of dried clay (as fillers), in a planetary mixer under vacuum for thirty minutes. The finished sealant compositions were filled into plastic tubes and then sealed in pouches under anhydrous conditions. The storage stability of the sealant was determined by striking a ratio of the aged flow rates and initial flow rates as earlier described. The rapidity of cure was determined by measurement of the lap shear strength of assemblies prepared and cured under the conditions earlier described.

TABLE I

| Example | Catalyst | Stability (Flow Ratio) | Lap Shear Strength (psi) after 2.7 hrs. |
|---|---|---|---|
| 6 | Dimorpholinodiethyl ether | 1.1 | 128 |
| 7 | N,N'—dimethylpiperazine | 2.4 | 54 |
| 8 | N,N,N',N'—tetramethyl-1,3-butanediamine | Not measureable since sealant gelled | 170 |
| 9 | Benzyldimethylamine | 1.0 | 0 |
| 10 | N—ethylmorpholine | 1.4 | 2.0 |
| 11 | Trimethylpiperazine | 2.2 | 49 |
| 12 | 2-dimethylaminoethyl-3 dimethylaminopropyl ether | Not measureable since sealant gelled | 130 |
| 13 | Bismuth octoate (1.6%) | 1.5 | 68 |

It can be seen from Table I that, among those catalysts conventionally used for polyurethane systems which were tested, DMDEE provides both the excellent shelf stability and fast cure properties that are required for industrial uses of moisture cureable fast cure sealants.

EXAMPLE 14–25

In following Table II are tabulated the lap shear strength observed in sealants combining polyurethane polymers of different isocyanate functionality with different concentrations of DMDEE catalyst. The results show that both functionality and catalyst concentration affect the speed of cure as measured by the lap shear strength after storage at 2.7 hours under the conditions earlier described, but that in each case the cure rates observed in the systems of the present invention are at least 60 psi, deemed to be the minimal acceptable cure rate for a one package system of this type.

More in particular, in each case the samples tested were formulated by combining polyurethane prepolymer, carbon black, and clay in the manner described for Examples 6–13 in the same ratios there disclosed, in the presence of the concentration of DMDEE catalyst indicated in Table II. Examples 14–17 employ the prepolymer of Example 1; Examples 18–20 employ the prepolymer of Example 2; Examples 21–23 employ the prepolymer of Example 3; Example 24 employs the polyether-polyester polyurethane of Example 4; and Example 25 employs the polyether-polyester polyurethane of Example 5.

TABLE II

| Example | NCO Functionality | DMDEE Catalyst (%) | Lap Shear Strength (PSI After 2.7 Hrs.) |
| --- | --- | --- | --- |
| 14 | 2.30 | 0.4 | 67 |
| 15 | 2.30 | 0.7 | 97 |
| 16 | 2.30 | 1.0 | 117 |
| 17 | 2.30 | 1.3 | 122 |
| 18 | 2.50 | 0.7 | 83 |
| 19 | 2.50 | 1.0 | 131 |
| 20 | 2.50 | 1.3 | 122 |
| 21 | 2.66 | 0.4 | 103 |
| 22 | 2.66 | 0.7 | 133 |
| 23 | 2.66 | 1.3 | 137 |
| 24 | 2.66 | 1.0 | 120 |
| 25 | 2.66 | 1.0 | 132 |

EXAMPLES 26 and 27

Moisture cureable sealant compositions were prepared by combining prepolymer, carbon black, and clay in the amounts and under the conditions described for Examples 6–13. For Example 26, the prepolymer of Example 1 having an isocyanate functionality of 2.3 was employed: for Example 27, the prepolymer of Example 3 with a functionality of 2.66 was employed. In each case, the compositions were combined with 1.4% by weight of bismuth octoate, a preferred catalyst in the prior art for the catalysis of polyurethane curing reactions. Table III below compares the properties of these sealants with the properties of the sealants of Examples 16 and 6 prepared from the same prepolymers but employing DMDEE as the catalyst.

TABLE III

| Example | NCO Functionality | Catalyst (%) | Stability (Flow Ratio) | Lap Shear Strength (PSI, 2.7 Hrs.) |
| --- | --- | --- | --- | --- |
| 26 | 2.30 | Bi octoate (1.4) | 1.3 | 35 |
| 27 | 2.66 | Bi octoate (1.4) | 1.8 | 57 |
| 16 | 2.30 | DMDEE (1.0) | 1.0 | 117 |
| 6 | 2.66 | DMDEE (1.0) | 1.1 | 128 |

What is claimed is:

1. A moisture curable sealant having good stability in the absence of moisture and a rapid cure rate in the sole presence of atmospheric moisture, said sealant comprising a polyurethane prepolymer having an isocyanate functionality between 2.5 and 2.7 and, admixed therewith as a catalyst, from 0.2 to 1.75 percent, by weight of said sealant, of dimorpholinodiethyl ether.

2. A sealant as in claim 1 wherein said catalyst is present in an amount of 0.4 to 1.3 percent by weight of said sealant.

3. A sealant as in claim 1 wherein said polyurethane prepolymer is the reaction product of an isocyanate having at least two isocyanate groups and a polyol.

4. A sealant as in claim 3 wherein said polyol is a polyether polyol.

5. A sealant as in claim 4 wherein said polyether polyol is a mixture of a polyether diol and a polyether triol.

6. A sealant as in clai wherein said polyether diol is a polyoxyalkylene diol and said polyether triol is a polyoxyalkylene triol.

7. A sealant as in claim 3 wherein said polyol is a mixture of a polyether polyol and a polyester polyol.

8. A sealant as in claim 1 which additionally comprises at least one filler and at least one plasticizer in amounts to obtain desired viscosity properties.

* * * * *